(12) United States Patent
Niimura et al.

(10) Patent No.: US 12,049,533 B2
(45) Date of Patent: Jul. 30, 2024

(54) ACRYLIC POLYMER COAGULATES

(71) Applicant: KURARAY CO., LTD., Kurashiki (JP)

(72) Inventors: Takuro Niimura, Tainai (JP); Masashi Akari, Tainai (JP); Hiroshi Ozawa, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 1037 days.

(21) Appl. No.: 16/965,481

(22) PCT Filed: Jan. 28, 2019

(86) PCT No.: PCT/JP2019/002731
§ 371 (c)(1),
(2) Date: Jul. 28, 2020

(87) PCT Pub. No.: WO2019/146782
PCT Pub. Date: Aug. 1, 2019

(65) Prior Publication Data
US 2021/0054113 A1 Feb. 25, 2021

(30) Foreign Application Priority Data
Jan. 29, 2018 (JP) ................................. 2018-013068

(51) Int. Cl.
| | | |
|---|---|---|
| *C08F 6/22* | (2006.01) | |
| *C08F 2/24* | (2006.01) | |
| *C08F 220/14* | (2006.01) | |
| *C08F 220/18* | (2006.01) | |
| *C08F 265/06* | (2006.01) | |
| *C08F 285/00* | (2006.01) | |
| *C08J 5/18* | (2006.01) | |
| *C08L 33/12* | (2006.01) | |

(52) U.S. Cl.
CPC .................. *C08F 6/22* (2013.01); *C08F 2/24* (2013.01); *C08F 220/14* (2013.01); *C08F 220/18* (2013.01); *C08F 265/06* (2013.01); *C08F 285/00* (2013.01); *C08J 5/18* (2013.01); *C08L 33/12* (2013.01)

(58) Field of Classification Search
CPC .. C08F 6/22; C08F 2/24; C08F 220/18; C08F 265/06; C08F 220/14; C08F 285/00; C08L 33/12; C08J 5/18
See application file for complete search history.

(56) References Cited

FOREIGN PATENT DOCUMENTS

| | | |
|---|---|---|
| EP | 2 716 707 A1 | 4/2014 |
| JP | 10-17626 A | 1/1998 |
| JP | 11-71437 A | 3/1999 |
| JP | 2000-119476 A | 4/2000 |
| JP | 2001-247621 A | 9/2001 |
| JP | 2003-277528 A | 10/2003 |
| JP | 2003-321549 A | 11/2003 |
| JP | 2003-342321 A | 12/2003 |
| JP | 2009-13318 A | 1/2009 |
| JP | 2017-61645 A | 3/2017 |
| JP | 2017-61646 A | 3/2017 |

OTHER PUBLICATIONS

International Search Report issued on May 7, 2019 in PCT/JP2019/002731 filed on Jan. 28, 2019, 2 pages.
Extended European Search Report issued Sep. 30, 2021 in European Patent Application No. 19743384.0, 7 pages.

*Primary Examiner* — Rabon A Sergent
(74) *Attorney, Agent, or Firm* — Oblon, McClelland, Maier & Neustadt, L.L.P.

(57) ABSTRACT

The present invention provides a multilayered acrylic polymer coagulate characterized in that the coagulate has a bulk density of 0.3 to 0.6 g/cm$^3$ and a median diameter of 50 to 400 μm and contains particles having a particle diameter of 75 or less in a proportion of 50% or less, and the amount of alkali metal and alkaline earth metal contained in the coagulate satisfies the following formula (1):

$$\Sigma(N/a) \times (120-Tg) \leq 100 \quad (1)$$

wherein
N represents the amount of alkali metal and alkaline earth metal contained in the coagulate (mmol/kg);
Tg represents the glass transition temperature (° C.) of the acetone-soluble matter of the coagulate; and
a represents the valency of the alkali metal and alkaline earth metal contained in the coagulate.

8 Claims, No Drawings

ACRYLIC POLYMER COAGULATES

TECHNICAL FIELD

The present invention relates to an acrylic polymer coagulate, and a method for producing the acrylic polymer coagulate. More specifically, the present invention relates to a coagulate that has excellent transparency, resistance to hot-water whitening, resistance to stress-whitening, film formability, and resistance to heat shrinkage. The present invention further relates to a molded article, a film, and a laminate obtained using the acrylic polymer coagulate.

BACKGROUND ART

Acrylic resins have excellent weather resistance, designability, and transparency; however, they have defects in terms of poor resistance to impact, and inferior toughness. To improve these disadvantages, various studies have been conducted on multilayered acrylic polymers comprising a combination of a soft layer and a hard layer and having a core-shell structure as a basic structure. Acrylic multilayer structure polymers are usually produced by the following steps: after a polymer latex produced by emulsion polymerization is coagulated, the coagulate is subjected to dewatering and drying to recover the coagulate in the form of a powder; and the powder is then often formed into a sheet or a film, and used. However, such an acrylic multilayer structure polymer coagulate has a problem in that if water-soluble substances, such as initiators, emulsifiers, defoaming agents, or coagulants, remain in the coagulate, a molded article thereof whitens when immersed in hot water or continuously used in a high-temperature and high-humidity environment (hereinafter referred to as hot-water whitening).

Patent Literature (PTL) 1, for example, attempts to improve resistance to hot-water whitening by providing an acrylic resin that comprises rubber particles dispersed in a methacrylic resin and that has a water-soluble matter content of 200 ppm or less, a haze value of 5% or less after immersion in 80° C. hot water for 1 hour, and a thickness of 50 μm or more and 600 μm or less.

On the other hand, to facilitate the removal of water-soluble substances during dewatering and to reduce problems in the manufacturing process, studies have been conducted to provide a coagulate that has a high bulk density, and that contains a reduced amount of fine particles. As methods for obtaining a coagulate having a high bulk density and a smaller amount of fine particles, for example, a method of adjusting the pH of an emulsion polymerization latex (Patent Literature (PTL) 2), and a method of spraying or adding dropwise an emulsion polymerization latex into a gas phase containing a coagulant solution in an aerosol state (Patent Literature (PTL) 3), have been studied.

However, if the bulk density of the coagulate is overly high and the amount of fine particles in the coagulate is overly small, water-soluble substances taken into the coagulate cannot be sufficiently removed. Consequently, a large amount of water-soluble substances may remain therein. In particular, in a salting-out coagulation method that uses a large amount of an inorganic salt, which is one of water-soluble substances, the conditions for recovery in which the process passability and quality are well balanced have yet to be found.

CITATION LIST

Patent Literature

PTL 1: JP2003-277528A
PTL 2: JP2017-61646A
PTL 3: JP2017-61645A

SUMMARY OF INVENTION

Technical Problem

An object of the present invention is to provide an acrylic polymer coagulate with excellent transparency, weather resistance, resistance to hot-water whitening, and resistance to boiling-water whitening.

Solution to Problem

In order to achieve the above object, the present inventors conducted repeated studies and accomplished the present invention, which includes the following embodiments.

[1] A multilayered acrylic polymer coagulate having a bulk density of 0.3 to 0.6 g/cm$^3$ and a median diameter of 50 to 400 μm and containing particles having a particle diameter of 75 μm or less in a proportion of 50% or less, wherein the amount of alkali metal and alkaline earth metal contained in the coagulate satisfies the following formula (1):

$$\Sigma(N/a) \times (120-Tg) \leq 100 \qquad (1)$$

wherein
N represents the amount of alkali metal and alkaline earth metal contained in the coagulate (mmol/kg),
Tg represents the glass transition temperature (° C.) of the acetone-soluble matter of the coagulate, and
a represents the valency of the alkali metal and alkaline earth metal contained in the coagulate.

[2] The coagulate according to [1], wherein the coagulate is obtained by a salting-out coagulation method.

[3] The coagulate according to [1] or [2], wherein the multilayered acrylic polymer consists of an acetone-soluble matter and an acetone-insoluble matter;
the acetone-soluble matter contains 80 to 99 mass % of a structural unit derived from methyl methacrylate and 1 to 20 mass % of a structural unit derived from alkyl acrylate having a $C_1$-$C_8$ alkyl group, and has a glass transition temperature of 80 to 100° C.; and
the acetone-insoluble matter contains 20 to 60 mass % of a structural unit derived from methyl methacrylate and 40 to 80 mass % of a structural unit derived from alkyl acrylate having a $C_1$-$C_8$ alkyl group, and has a glass transition temperature of 0° C. or less.

[4] The coagulate according to [1] or [2], wherein the multilayered acrylic polymer consists of an acetone-soluble matter and an acetone-insoluble matter,
the acetone-soluble matter contains 80 to 99 mass % of a structural unit derived from methyl methacrylate and 1 to 20 mass % of a structural unit derived from alkyl acrylate having a $C_1$-$C_8$ alkyl group, and has a glass transition temperature of 90 to 110° C., and
the acetone-insoluble matter contains 40 to 60 mass % of a structural unit derived from methyl methacrylate, 40 to 60 mass % of a structural unit derived from alkyl acrylate having a $C_1$-$C_8$ alkyl group, and 0 to 20 mass % of a vinyl monomer copolymerizable therewith, and has a glass transition temperature of 0° C. or less.

[5] A molded article obtained by using the coagulate of any one of [1] to [4].
[6] A film obtained by using the coagulate of any one of [1] to [4].
[7] A laminate comprising at least one layer formed of a film obtained using the coagulate of any one of [1] to [4], and at least one layer formed of a molded article comprising at least one other thermoplastic polymer.
[8] A method for producing a multilayered acrylic polymer coagulate, comprising the following steps 1 to 5:

step 1 of polymerizing an acrylic monomer, at least one other monomer that is copolymerizable, a grafting agent and/or a crosslinking agent in the presence of an emulsifier to obtain a latex (I), step 2 of polymerizing an acrylic monomer, at least one other monomer that is copolymerizable, and a grafting agent, optionally with a crosslinking agent, in the presence of the latex (I) to obtain a latex (II), step 3 of polymerizing an acrylic monomer in the presence of the latex (II) to obtain a latex (III), step 4 of loosely aggregating the latex (III) in the presence of a coagulant to obtain a multilayered acrylic polymer aggregate, and step 5 of heating the multilayered acrylic polymer aggregate obtained in step 4 to obtain a multilayered acrylic polymer coagulate, wherein the obtained coagulate has a bulk density of 0.3 to 0.6 g/cm$^3$ and a median diameter of 50 to 400 μm and contains particles having a particle diameter of 75 μm or less in a proportion of 50% or less, and the amount of alkali metal and alkaline earth metal contained in the coagulate satisfies the following formula (1):

$$\Sigma(N/a)\times(120-Tg)\leq 100 \quad (1)$$

wherein

N represents the amount of alkali metal and alkaline earth metal contained in the coagulate (mmol/kg), Tg represents the glass transition temperature (° C.) of the acetone-soluble matter of the coagulate; and a represents the valency of the alkali metal and alkaline earth metal contained in the coagulate.

Advantageous Effects of Invention

The acrylic polymer coagulate of the present invention, and the molded article, film, and laminate obtained by using the coagulate, have excellent transparency, weather resistance, resistance to hot-water whitening, and resistance to boiling-water whitening.

DESCRIPTION OF EMBODIMENTS

The coagulate of the present invention comprises a multilayered acrylic polymer.

The multilayered acrylic polymer can be in the form of a powder, granules, an aggregate, or a coagulate.

The coagulate of the present invention preferably has a bulk density of 0.3 to 0.6 g/cm$^3$, more preferably 0.35 g/cm$^3$ to 0.55 g/cm$^3$, and even more preferably 0.4 to 0.5 g/cm$^3$. A lower bulk density tends to worsen the process passability, whereas a higher bulk density tends to worsen the quality.

The coagulate of the present invention preferably has a median diameter, as measured by a light scattering method, of 50 to 400 μm, more preferably 75 to 375 μm, and even more preferably 100 to 350 μm. A smaller median diameter tends to worsen the process passability, whereas a larger median diameter tends to worsen the quality.

The coagulate of the present invention contains particles having a particle size, as measured by a light scattering method, of 75 μm or less in a proportion of 50% or less, more preferably 40% or less, and even more preferably 30% or less, based on the total amount of particles contained therein. A higher proportion of the particles having a particle diameter of 75 μm or less tends to worsen the process passability.

The measurement of the median diameter and the particle size by a light scattering method can be performed, for example, by using an LA-950V2 particle size distribution analyzer of a laser diffraction/scattering-type measurement system, manufactured by Horiba, Inc.

The coagulate of the present invention preferably has a parameter, represented by the following formula (1A), of 100 or less, more preferably 90 or less, and even more preferably 80 or less:

$$\Sigma(N/a)\times(120-Tg) \quad (1A)$$

wherein N represents the amount of alkali metal and alkaline earth metal contained in the coagulate (mmol/kg);

Tg represents the glass transition temperature (° C.) of the acetone-soluble matter of the coagulate; and a represents the valency of the alkali metal and alkaline earth metal contained in the coagulate.

As the parameter obtained by formula (TA) is a smaller value, the film obtained from the coagulate tends to have a higher resistance to hot-water or boiling-water whitening.

Formula (1) indicates that as the coagulate contains alkali metal(s) and alkaline earth metal(s) (water-soluble components) in smaller amounts, water is less likely to penetrate into the film, thus increasing the resistance to hot-water or boiling-water whitening; and that as the coagulate has a higher Tg, thermal movement (softening) of the resin is less likely to occur, thus increasing the resistance to hot-water or boiling-water whitening.

Alkali metals include sodium, potassium, lithium, rubidium, and cesium. The alkali metals measured in relation to formula (1) are preferably two kinds: sodium and potassium. Alkaline earth metals include magnesium, calcium, strontium, and barium. The alkaline earth metals measured in relation to formula (1) are preferably two kinds: magnesium and calcium.

The acetone-soluble matter and the acetone-insoluble matter of the coagulate of the present invention can be measured as follows. Specifically, 2 g of the coagulate of the present invention is placed in 50 mL of acetone, and the resulting mixture is stirred at ordinary temperature for 24 hours. The entire volume of the obtained liquid is centrifuged using a centrifugal separator at a rotation speed of 20000 rpm and a temperature of 0° C. for 180 minutes to separate a supernatant and a precipitate. The obtained supernatant and precipitate are individually dried in vacuum at 50° C. for 8 hours to respectively obtain an acetone-soluble matter (the residue obtained by evaporation of acetone from the supernatant) and an acetone-insoluble matter (the precipitate), and the mass of these portions is measured to determine the amounts of the acetone-soluble matter and the acetone-insoluble matter.

In a preferred embodiment of the invention, the acetone-insoluble matter is present inside of the multilayered acrylic polymer, whereas the acetone-soluble matter is present outside or on the surface of the multilayered acrylic polymer. For example, when the multilayered acrylic polymer has a two-layer structure consisting of a core layer and a shell layer, the shell layer may be composed of an acetone-soluble matter, or mainly comprise an acetone-soluble matter; and the core layer may be composed of an acetone-insoluble matter, or mainly comprise an acetone-insoluble matter. When the multilayered acrylic polymer has a three-layer structure consisting of a core layer, an inner-shell layer, and an outer-shell layer, the core layer may be composed of an acetone-insoluble matter, or mainly comprise an acetone-insoluble matter; the outer shell layer may be composed of an acetone-soluble matter, or mainly comprise an acetone-soluble matter; and the inner shell layer may be composed of either an acetone-soluble matter or an acetone-insoluble matter, or contain both an acetone-soluble matter and an acetone-insoluble matter in specific proportions. Preferably, the inner shell layer is composed of an acetone-insoluble matter, or mainly comprises an acetone-insoluble matter.

The number of the layers of the multilayered acrylic polymer is 2 to 5, preferably 2 to 4, and particularly preferably 3. When the multilayered acrylic polymer is composed of 4 layers or more, the outermost layer is composed of an acetone-soluble matter, or mainly comprises an acetone-soluble matter; the core layer is composed of an acetone-insoluble matter, or mainly comprises an acetone-insoluble matter; and at least one intermediate layer between the core layer and the outermost layer may be composed of either an acetone-soluble matter or an acetone-insoluble matter, or may contain both an acetone-soluble matter and an acetone-insoluble matter in specific proportions.

In this specification, the multilayered acrylic polymer consists of an acetone-soluble matter and an acetone-insoluble matter.

The acetone-soluble matter is preferably composed of a structural unit derived from methyl methacrylate and a structural unit derived from alkyl acrylate having a $C_1$-$C_8$ alkyl group, and may further contain alkyl methacrylate having a $C_2$-$C_8$ alkyl group. A preferable acetone-soluble matter contains 80 to 99 mass % of a structural unit derived from methyl methacrylate, and 1 to 20 mass % of a structural unit derived from alkyl acrylate having a $C_1$-$C_8$ alkyl group. The polymer comprising the acetone-soluble matter preferably has a glass transition temperature of 80 to 110° C., and more preferably 80 to 100° C. or 90 to 110° C.

The acetone-insoluble matter can contain a structural unit derived from methyl methacrylate, a structural unit derived from alkyl acrylate having a $C_1$-$C_8$ alkyl group, a structural unit derived from a crosslinking agent and/or a grafting agent, and a structural unit derived from at least one other monomer that is copolymerizable. Preferably, the acetone-insoluble matter contains a structural unit derived from methyl methacrylate in an amount of 20 to 60 mass %, more preferably 40 to 60 mass %; a structural unit derived from alkyl acrylate having a $C_1$-$C_8$ alkyl group in an amount of 40 to 80 mass %, preferably 40 to 60 mass %; and a vinyl monomer copolymerizable therewith in an amount of 0 to 20 mass %. The polymer(s) of the acetone-insoluble matter preferably have a glass transition temperature of 0° C. or less.

The layer structure of the multilayered acrylic polymer is preferably, for example, a core-shell multilayer structure. The acrylic polymer having a core-shell multilayer structure can be obtained, for example, by melting and kneading a three-layer granule composed of a core, an inner shell, and an outer shell. In one preferred embodiment of the present invention, the polymer constituting the core is different from the polymer constituting the inner shell, and the polymer constituting the inner shell is different from the polymer constituting outer shell. Preferably, the core and the inner shell are in contact with each other with no space therebetween, and the inner shell and the outer shell are in contact with each other with no space therebetween. The polymer constituting the inner shell is preferably softer than the polymer constituting the core or the polymer constituting the outer shell. The polymer constituting the inner shell and the polymer constituting the core are preferably insoluble in acetone. The polymer constituting the outer shell is preferably soluble in acetone. The polymer constituting the outer shell can fuse entirely or partially due to melting and kneading of the three-layer granule, thus forming a matrix of two-layer granules composed of a core and an inner shell.

The three-layer granules contained in the core-shell multilayered acrylic polymer coagulate have an average particle size whose lower limit is preferably 0.01 μm, more preferably 0.04 μm, even more preferably 0.05 μm, and still even more preferably 0.1 μm; and whose upper limit is preferably 0.35 μm, more preferably 0.3 μm, even more preferably 0.2 μm, and still even more preferably 0.15 μm. As the granules have a larger average particle size, the obtained film tends to have a lower resistance to stress-whitening. The average particle size of the three-layer granules is a value determined by a light scattering method. A latex obtained by a polymerization reaction (an acrylic polymer having a core-shell multilayer structure or a three-layer granule) is aggregated (first coagulation step) and granulated (second coagulation step) to thereby obtain a coagulate of the present invention. The obtained coagulate has a median diameter of 50 to 400 μm, and contains particles with a particle diameter of 75 μm or less in a proportion of not more than 50%.

The multilayered acrylic polymer is preferably a core-shell multilayered acrylic polymer comprising a rigid polymer (a), a crosslinked rubber polymer (b), and a rigid polymer (c) that form a layered structure. In the core-shell multilayered acrylic polymer, more preferably, the rigid polymer (a) constitutes the core, the crosslinked rubber polymer (b) constitutes the inner shell, and the rigid polymer (c) constitutes the outer shell. Further, the acrylic polymer coagulate may additionally comprise a single-layered acrylic polymer consisting only of a rigid polymer (c), in order to improve the dispersibility at the time of melting and kneading the core-shell multilayered acrylic polymer.

The rigid polymer (a) is a polymer comprising a structural unit derived from methyl methacrylate, a structural unit derived from alkyl acrylate, and a structural unit derived from a grafting agent; and, as needed, further comprising a structural unit derived from a crosslinking agent, and a structural unit derived from at least one other monomer that is copolymerizable.

The amount of the structural unit derived from methyl methacrylate in the rigid polymer (a) is preferably 40 to 98.99 mass %, and more preferably 90 to 96.9 mass %, based on the total amount of the structural units of the rigid polymer (a). As the structural unit derived from methyl methacrylate is present in a smaller amount, the obtained film tends to have low weather resistance. As the structural unit derived from methyl methacrylate is present in a larger amount, the obtained film tends to have a lower impact resistance.

The amount of the structural unit derived from alkyl acrylate in the rigid polymer (a) is preferably 1 to 60 mass %, and more preferably 3 to 10 mass %, based on the total amount of the structural units of the rigid polymer (a). The alkyl group of the alkyl acrylate preferably contains 1 to 8 carbon atoms. As the structural unit derived from alkyl acrylate is present in a smaller amount, the multilayered acrylic polymer tends to have a lower resistance to thermal decomposition. As the structural unit derived from alkyl acrylate is present in a larger amount, the obtained film tends to have a higher resistance to hot-water or boiling-water whitening.

The amount of the structural unit derived from the grafting agent in the rigid polymer (a) is preferably 0.01 to 1 mass %, and more preferably 0.1 to 0.5 mass %, based on the total amount of the structural units of the rigid polymer (a). As the structural unit derived from the grafting agent is present in a smaller amount, cohesive strength between the rigid polymer (a) and the crosslinked rubber polymer (b) tends to decrease. As the structural unit derived from the grafting agent is present in a larger amount, the obtained film tends to have a lower impact resistance.

The amount of the structural unit derived from the crosslinking agent in the rigid polymer (a) is preferably 0 to 0.5 mass %, and more preferably 0 to 0.2 mass %, based on the total amount of the structural units of the rigid polymer (a). As the structural unit derived from the crosslinking agent is present in a larger amount, the obtained film tends to have a lower impact resistance.

The amount of the structural unit derived from the at least one other monomer that is copolymerizable in the rigid polymer (a) is preferably 0 to 20 mass %, and more preferably 0 to 10 mass %, based on the total amount of the structural units of the rigid polymer (a).

In a preferred embodiment of the invention, the crosslinked rubber polymer (b) is a polymer comprising a structural unit derived from alkyl acrylate and a structural unit derived from a grafting agent; and, as needed, further comprising a structural unit derived from methyl methacrylate, a structural unit derived from a crosslinking agent, and a structural unit derived from at least one other monomer that is copolymerizable.

The amount of the structural unit derived from alkyl acrylate in the crosslinked rubber polymer (b) is preferably 70 to 99.5 mass %, and more preferably 80 to 99 mass %, based on the total amount of the structural units of the crosslinked rubber polymer (b). The alkyl group of the alkyl acrylate preferably contains 1 to 8 carbon atoms. As the structural unit derived from alkyl acrylate is present in a smaller amount, the obtained film tends to have a lower impact resistance. As the structural unit derived from alkyl acrylate is present in a larger amount, the obtained film tends to have a lower resistance to stress-whitening, and poor transparency.

The amount of the structural unit derived from the grafting agent in the crosslinked rubber polymer (b) is preferably 0.5 to 5 mass %, and more preferably 1 to 3 mass %, based on the total amount of the structural units of the crosslinked rubber polymer (b). As the structural unit derived from the grafting agent is present in a smaller amount, the obtained film tends to have a lower resistance to stress-whitening. As the structural unit derived from the grafting agent is present in a larger amount, the obtained film tends to have a lower impact resistance.

The amount of the structural unit derived from methyl methacrylate in the crosslinked rubber polymer (b) is preferably 0 to 30 mass %, and more preferably 0 to 20 mass %, based on the total amount of the structural units of the crosslinked rubber polymer (b). As the structural unit derived from methyl methacrylate is present in a larger amount, the obtained film tends to have a lower impact resistance.

The amount of the structural unit derived from the crosslinking agent in the crosslinked rubber polymer (b) is preferably 0 to 5 mass %, and more preferably 0 to 2 mass %, based on the total amount of the structural units of the crosslinked rubber polymer (b). As the structural unit derived from the crosslinking agent is present in a larger amount, the obtained film tends to have a lower impact resistance.

The crosslinked rubber polymer (b) preferably contains a structural unit derived from at least one other monomer that is copolymerizable, in an amount of 0 to 40 mass %, and more preferably 0 to 30 mass %, based on the total amount of the structural units of the crosslinked rubber polymer (b).

The rigid polymer (c) is a polymer comprising a structural unit derived from methyl methacrylate, and a structural unit derived from alkyl acrylate.

The amount of the structural unit derived from methyl methacrylate in the rigid polymer (c) is preferably 80 to 99 mass %, and more preferably 95 to 98 mass %, based on the total amount of the structural units of the rigid polymer (c). As the structural unit derived from methyl methacrylate is present in a smaller amount, the obtained film tends to have a lower resistance to stress-whitening. As the structural unit derived from methyl methacrylate is present in a higher amount, the multilayered acrylic polymer tends to have a lower resistance to thermal decomposition.

The amount of the structural unit derived from alkyl acrylate in the rigid polymer (c) is preferably 1 to 20 mass %, and more preferably 2 to 5 mass %, based on the total amount of the structural units of the rigid polymer (c). The alkyl group of the alkyl acrylate preferably contains 1 to 8 carbon atoms. As the structural unit derived from alkyl acrylate is present in a smaller amount, the multilayered acrylic polymer tends to have a lower resistance to thermal decomposition. As the structural unit derived from alkyl acrylate is present in a larger amount, the obtained film tends to have a lower resistance to stress-whitening.

The rigid polymer (c) preferably has a glass transition temperature of 80° C. or more, more preferably 90° C. or more, and even more preferably 100° C. or more. As the rigid polymer (c) has a higher glass transition temperature, the obtained film tends to have a higher resistance to hot-water or boiling-water whitening.

Examples of the alkyl acrylate used in the rigid polymer (a), the crosslinked rubber polymer (b), and the rigid polymer (c) include methyl acrylate, ethyl acrylate, n-propyl acrylate, n-butyl acrylate, s-butyl acrylate, t-butyl acrylate, n-butyl methyl acrylate, n-heptyl acrylate, 2-ethylhexyl acrylate, n-octyl acrylate, and the like. These alkyl acrylates can be used singly, or in a combination of two or more. Among these, methyl acrylate and/or n-butyl acrylate is preferable.

The grafting agent used in the rigid polymer (a) and the crosslinked rubber polymer (b) is a monomer that is considered to have a main role in chemical bonding of the rigid polymer (a) to the crosslinked rubber polymer (b), and chemical bonding of the crosslinked rubber polymer (b) to the rigid polymer (c); and also have an auxiliary role in forming a crosslinked structure in the rigid polymer (a) or the crosslinked rubber polymer (b).

The grafting agent is a monomer that has two or more different kinds of polymerizable groups. Examples of grafting agents include allyl methacrylate, ally acrylate, mono- or di-allyl maleate, mono- or di-allyl fumarate, crotyl acrylate, crotyl methacrylate, and the like. These grafting agents can be used singly, or in a combination of two or more. Among these, ally methacrylate is preferably used because it is excellent in terms of the action of improving the bonding ability between the rigid polymer (a) and the crosslinked rubber polymer (b), or between the crosslinked rubber polymer (b) and the rigid polymer (c) and thus increasing the stress-whitening resistance and transparency of the film.

The crosslinking agent used in the rigid polymer (a) and the crosslinked rubber polymer (b) is a monomer that is considered to have a main role in forming a crosslinked structure in the rigid polymer (a) or the crosslinked rubber polymer (b).

The crosslinking agent is a monomer that has two or more polymerizable groups of the same kind. For examples, the crosslinking agent can be a diacryl compound, a dimethacryl compound, a diallyl compound, a divinyl compound, a diene compound, a trivinyl compound, or the like. Examples of crosslinking agents include ethylene glycol di(meth)acrylate, butylene glycol di(meth)acrylate, propylene glycol di(meth)acrylate, polyethylene glycol di(meth)acrylate, divinyl benzene, trivinyl benzene, ethylene glycol diallyl ether, propylene glycol diallyl ether, butadiene, and the like. These crosslinking agents can be used singly, or in a combination of two or more.

The at least one other monomer that is polymerizable, which is used in the rigid polymer (a) and the crosslinked rubber polymer (b), may be any vinyl monomer that can be copolymerized with methacrylic acid ester. Examples include aromatic vinyl monomers such as styrene, p-methylstyrene, o-methylstyrene, and vinyl naphthalene; unsaturated nitrile monomers such as acrylonitrile; olefin monomers such as ethylene and propylene; vinyl halide monomers such as vinyl chloride, vinylidene chloride, and vinylidene fluoride; unsaturated carboxylic acid monomers such as acrylic acid, methacrylic acid, and maleic anhydride; and maleimide monomers such as vinyl acetate, N-propylmaleimide, N-cyclohexylmaleimide, and N-o-chlorophenylmaleimide. These compounds can be used singly, or in a combination of two or more.

The coagulate of the present invention preferably has a melt flow rate, at 230° C. under a load of 3.8 kg, of 0.5 to 20 g/10 min, and more preferably 0.8 to 10 g/10 min. As the multilayered acrylic polymer has a lower melt flow rate, the fluidity and film formability of the multilayered acrylic polymer tend to decrease. As the multilayered acrylic polymer has a higher melt flow rate, the mechanical properties of the obtained film tend to decrease.

The acetone-soluble matter and the acetone-insoluble matter can be measured as follows. Specifically, 2 g of the coagulate is placed in 50 mL of acetone, and the resulting mixture is stirred at ordinary temperature for 24 hours. The entire volume of the obtained liquid is centrifuged using a centrifugal separator at a rotation speed of 20000 rpm and at a temperature of 0° C. for 180 minutes to separate a supernatant and a precipitate. The obtained supernatant and precipitate are individually dried in vacuum at 50° C. for 8 hours to respectively obtain an acetone-soluble matter (the residue obtained by evaporation of acetone from the supernatant) and an acetone-insoluble matter (the precipitate), and the mass of these portions is measured to determine the amounts of the acetone-soluble matter and the acetone-insoluble matter.

In one preferred embodiment of the present invention, the acetone-soluble matter of the acrylic polymer coagulate contains 80 to 99 mass % of a structural unit derived from methyl methacrylate, and 1 to 20 mass % of a structural unit derived from alkyl acrylate having a $C_1$-$C_8$ alkyl group, and has a glass transition temperature of 80 to 110° C., and preferably 80 to 100° C. or 90 to 110° C.; and the acetone-insoluble matter contains 20 to 60 mass %, and more preferably 40 to 60 mass %, of a structural unit derived from methyl methacrylate, 40 to 80 mass %, and more preferably 40 to 60 mass %, of a structural unit derived from alkyl acrylate having a $C_1$-$C_8$ alkyl group, and 0 to 20 mass % of a vinyl monomer that is copolymerizable therewith, and has a glass transition temperature of 0° C. or less.

In a preferred embodiment of the present invention, the acetone-insoluble matter of the acrylic polymer coagulate has an acid value of 0.008 mmol/g or less, more preferably 0.006 mmol/g or less, and even more preferably 0.004 mmol/g or less. The lower limit of the acid value of the acetone-insoluble matter in the multilayered acrylic polymer is preferably 0.001 mmol/g. As the acetone-insoluble matter of the multilayered acrylic polymer has a lower acid value, the obtained film tends to have a higher resistance to hot-water or boiling-water whitening.

In a preferred embodiment of the invention, the acetone-soluble matter in the multilayered acrylic polymer coagulate preferably has an acid value of 0.012 mmol/g or less, more preferably 0.009 mmol/g or less, and even more preferably 0.007 mmol/g or less. The lower limit of the acid value of the acetone-soluble matter in the multilayered acrylic polymer is preferably 0.001 mmol/g. As the multilayered acrylic polymer has a lower acid value, the obtained film tends to have a higher resistance to hot-water or boiling-water whitening.

The rigid polymer (a), the crosslinked rubber polymer (b), and polymer chains of the rigid polymer (c) that are graft-bonded to polymer chains of the crosslinked polymer (b) are detected as the acetone-insoluble matter. Polymer chains of the rigid polymer (c) that are not graft-bonded to polymer chains of the crosslinked polymer (b) are detected as the acetone-soluble matter.

The method for producing the multilayered acrylic polymer is not particularly limited. For example, the rigid polymer (a), the crosslinked rubber polymer (b), and the rigid polymer (c) can be sequentially formed by a seeded emulsion polymerization method to thereby obtain an acrylic polymer having a core-shell multilayer structure.

A preferable method for producing the coagulate of the present invention comprises the steps of: subjecting an acrylic monomer to an emulsion polymerization to obtain a latex containing a multilayered acrylic polymer; coagulating the latex containing the multilayered acrylic polymer to obtain a slurry; washing and dewatering the slurry; and drying the dewatered slurry.

A more preferable method for producing the coagulate of the present invention comprises polymerizing (performing 1st polymerization) 40 to 98.99 mass %, more preferably 90 to 96.9 mass %, of methyl methacrylate, 1 to 60 mass %, more preferably 3 to 10 mass %, of alkyl acrylate having a $C_1$-$C_8$ alkyl group, 0.01 to 1 mass %, more preferably 0.1 to 0.5 mass %, of a grafting agent, and 0 to 0.5 mass %, more preferably 0 to 0.2 mass %, of a crosslinking agent in the presence of an emulsifying agent to obtain a latex (I) containing the rigid polymer (a); polymerizing (performing 2nd polymerization) 70 to 99.5 mass %, more preferably 80 to 99 mass %, of alkyl acrylate having a $C_1$-$C_8$ alkyl group, 0 to 30 mass %, more preferably 0 to 20 mass %, of methyl methacrylate, 0.5 to 5 mass %, more preferably 1 to 3 mass %, of a grafting agent, and 0 to 5 mass %, more preferably 0 to 2 mass %, of a crosslinking agent in the presence of the latex (I) to obtain a latex (II) containing the rigid polymer (a) and the crosslinked rubber polymer (b); copolymerizing (performing 3rd polymerization) 80 to 99 mass %, more preferably 95 to 98 mass %, of methyl methacrylate, and 1 to 20 mass %, more preferably 2 to 5 mass %, of alkyl acrylate having a $C_1$-$C_8$ alkyl group in the presence of the latex (II) to obtain a latex (III) containing the rigid polymer (a), the crosslinked rubber polymer (b), and the rigid polymer (c); coagulating the latex (III) to obtain a slurry; washing and dewatering the slurry; and drying the dewatered slurry.

The polymerization can be performed by a known method. Among polymerizations performed in the presence of a latex, seeded emulsion polymerization is preferably used to obtain an acrylic polymer having a core-shell multilayer structure. Since emulsion polymerization or seeded polymerization is a method well-known in the art, such polymerization can be performed in a usual manner.

The feed rate of a mixture of the monomers used in each polymerization, more specifically, a mixture of methyl methacrylate, alkyl acrylate, at least one other monomer that is copolymerizable, a grafting agent, and a crosslinking agent in the proportions described above, to a reaction system is preferably 0.05 to 3 mass % per minute, more preferably 0.1 to 1 mass % per minute, and even more preferably 0.2 to 0.8 mass % per minute, per 100 mass % in total of the monomers used in each polymerization. When the monomers are provided at a feed rate within the above range, the generation of an undesirable polymer aggregate or deposition of a polymer scale on a reactor can be prevented; accordingly, the obtained resin film can be prevented from having a poor appearance, such as fish-eyes, which may occur due to contamination with a polymer aggregate or a polymer scale.

The polymerization initiator to be used in each polymerization is not particularly limited. Examples of polymerization initiators include water-soluble inorganic initiators such as potassium persulfate and ammonium persulfate; redox initiators comprising a combination of an inorganic initiator with a sulfite or a thiosulfate; redox initiators comprising a combination of an organic peroxide with a ferrous salt or sodium sulfoxylate; and the like. The polymerization initiator may be added to a reaction system all at once at the start of the polymerization; or may be added to the reaction system in divided portions at the start of the polymerization and during the course of polymerization, in consideration of the reaction rate or the like. The amount of polymerization initiator to be used can be appropriately set so that the average particle size of granules contained in the acrylic polymer having a core-shell multilayer structure falls within the above-mentioned range.

The emulsifying agent to be used in each of the polymerizations is not particularly limited. Examples of emulsifying agents include anionic emulsifying agents such as long-chain alkyl sulfonates, alkyl sulfosuccinates, and alkyl benzene sulfonates; and nonionic emulsifying agents such as polyoxyethylene alkyl ethers and polyoxyethylene nonylphenyl ethers; nonionic anionic emulsifying agents, for example, polyoxyethylene nonylphenyl ether sulfates such as sodium polyoxyethylene nonylphenyl ether sulfate, polyoxyethylene alkyl ether sulfates such as sodium polyoxyethylene alkyl ether sulfate, and alkyl ether carboxylates such as sodium polyoxyethylene tridecyl ether acetate. The amount of emulsifying agent to be used can be appropriately set, for example, so that the average particle size of granules contained in the acrylic polymer having a core-shell multilayer structure falls within the above-mentioned range.

In the present invention, the 1st polymerization, the 2nd polymerization, and the 3rd polymerization may be performed sequentially in one polymerization tank, or may be performed sequentially by changing the polymerization tank at each of the 1st polymerization, the 2nd polymerization, and the 3rd polymerization. In the present invention, the polymerizations are preferably performed sequentially in one polymerization tank. Furthermore, the temperature of the reaction system during the polymerization is preferably 30 to 120° C., and more preferably 50 to 100° C.

Further, if necessary, a reactive UV absorber, such as 2-[2-hydroxy-5-(2-methacryloyloxyethyl)phenyl]-2H-1,2, 3-benzotriazole, can be added in any of the 1st polymerization, the 2nd polymerization, and the 3rd polymerization. The reactive UV absorber is introduced into a molecular chain of the multilayered acrylic polymer to thereby improve the UV resistance of the multilayered acrylic polymer. The amount of the reactive UV absorber to be added is preferably 0.05 to 5 parts by mass per 100 parts by mass in total of the monomers used in the polymerization.

A chain transfer agent can be used in each polymerization to adjust the molecular weight. In the 3rd polymerization, a chain transfer agent is added to the reaction system to adjust the molecular weight of the rigid polymer (c), whereby the melt flow rate of the multilayered acrylic polymer can be adjusted to the above-mentioned range. The chain transfer agent used in each polymerization is not particularly limited. Examples of chain transfer agents include alkyl mercaptans such as n-octyl mercaptan, n-dodecyl mercaptan, t-dodecyl mercaptan, and n-hexadecyl mercaptan; xanthogen disulfides such as dimethyl xanthogen disulfide and diethyl xanthogen disulfide; thiuram disulfides such as tetrathiuram disulfide; and halogenated hydrocarbons such as carbon tetrachloride and ethylene bromide. The amount of chain transfer agent to be used can be appropriately set within the range where the polymer can be adjusted to a predetermined molecular weight in each polymerization. The amount of the chain transfer agent to be used in the 3rd polymerization is an amount capable of adjusting the melt flow rate to the above-mentioned range. The amount of chain transfer agent to be used in the 3rd polymerization may vary depending on, for example, the amount of polymerization initiator used in the 3rd polymerization. The amount of the chain transfer is preferably 0.05 to 2 parts by mass, more preferably 0.08 to 1 part by mass, per 100 parts by mass in total of the monomers used in the 3rd polymerization, more specifically methyl methacrylate and alkyl acrylate.

In the present invention, the multilayered acrylic polymer is recovered from the emulsion latex by coagulating the emulsion latex. The latex can be coagulated by a known method. Examples of the coagulation method include a freeze coagulation method, a salting-out coagulation method, an acid precipitation coagulation method, and the like. Among these, the salting-out coagulation method, which is capable of continuously producing a high-quality coagulate, is preferable.

The coagulant that can be used in the present invention may be any aqueous solution of an inorganic acid or a salt thereof and/or an organic acid or a salt thereof, as long as it has the property of being capable of precipitating and/or coagulating the latex prepared by emulsion polymerization.

Specific examples of the inorganic acid solution, the inorganic acid salt solution, the organic acid solution, or the organic acid salt solution include aqueous solutions of the following: alkali metal halides such as sodium chloride, potassium chloride, lithium chloride, sodium bromide, potassium bromide, lithium bromide, potassium iodide, and sodium iodide; alkali metal sulfates such as potassium sulfate and sodium sulfate; ammonium sulfate; ammonium chloride; alkali metal nitrates such as sodium nitrate and potassium nitrate; inorganic salts such as calcium chloride, ferrous sulfate, magnesium sulfate, calcium acetate, zinc sulfate, copper sulfate, barium chloride, ferrous chloride, ferric chloride, magnesium chloride, ferric sulfate, aluminum sulfate, potassium alum, and iron alum. These aqueous solutions can be used singly, or in a combination of two or more. Among these, aqueous solutions of monovalent and divalent inorganic acid salts, such as sodium chloride, potassium chloride, sodium sulfate, ammonium chloride, calcium chloride, magnesium chloride, magnesium sulfate, barium chloride, and calcium acetate, can be suitably used. The method for adding the coagulant is not specifically limited. One-time addition, divided addition, or continuous addition can be used.

The emulsion latex can be coagulated by adding a coagulant to one multilayered acrylic polymer comprising a rigid polymer (a), a crosslinked rubber polymer (b), and a rigid polymer (c); a mixture of two or more such multilayered acrylic polymers; or a mixture of a multilayered acrylic polymer comprising a rigid polymer (a), a crosslinked rubber polymer (b), and a rigid polymer (c), and at least one single-layered acrylic polymer latex.

First Coagulation (Aggregation Step)

The first coagulation (aggregation step) is a reaction of performing a loose aggregation in which an emulsion latex and a coagulant solution are mixed with heating to allow the aggregation to proceed at a slow rate.

The polymer concentration of the emulsion latex in the first coagulation (aggregation step) is preferably 5 to 25 mass %, more preferably 7.5 to 22.5 mass %, and even more preferably 10 to 20 mass %. As the emulsion latex has a lower polymer concentration, it tends to be difficult for the aggregation to proceed. As the emulsion latex has a higher polymer concentration, the aggregation proceeds easily; however, it tends to be difficult to control due to its high viscosity.

The concentration of the coagulant to be added in the first coagulation (aggregation step) is 0.1 to 10 mass parts, more preferably 0.5 to 7.5 mass parts, and even more preferably 1.0 to 5.0 mass parts, per 100 mass parts of the polymer in the emulsion latex. As the coagulant is added at a lower concentration, it is difficult for the aggregation to proceed. As the coagulant is added at a higher concentration, the aggregation proceeds easily; however, the obtained coagulate tends to have a poor resistance to hot-water or boiling-water whitening.

The liquid temperature in the first coagulation (aggregation step) is preferably 60 to 90° C., more preferably 65 to 85° C., and even more preferably 70 to 80° C. A lower temperature tends to result in insufficient aggregation and a smaller particle size of the coagulate. As the liquid has a higher temperature, the aggregation proceeds easily; however, it tends to be difficult to control.

The residence time in the first coagulation (aggregation step) is preferably 0.25 to 2.0 hours, more preferably 0.5 to 1.75 hours, and even more preferably 0.75 to 1.5 hours. A shorter residence time tends to result in insufficient aggregation and a smaller particle size of the obtained coagulate. As the residence time is longer, the aggregation proceeds easily; however, the obtained coagulate tends to have a poor resistance to hot-water or boiling-water whitening.

Second Coagulation (Granulation Step)

The second coagulation (granulation step) comprises further heating the slurry obtained in the first coagulation (aggregation step) to reduce fine particles that have yet to be fully aggregated, and to increase the bulk density of the coagulate.

Before the second coagulation (granulation step), the polymer concentration can be adjusted by adding ion exchange water to the slurry obtained by aggregation. The polymer concentration of the slurry after the dilution is preferably 1 to 20 mass %, more preferably 3 to 17.5 mass %, and even more preferably 5 to 15 mass %. As the emulsion latex has a lower polymer concentration, it is difficult for granulation to proceed. As the emulsion latex has a higher polymer concentration, the granulation proceeds easily; however, the obtained coagulate tends to have a poor resistance to hot-water or boiling-water whitening.

The liquid temperature in the second coagulation (granulation step) is preferably 80 to 110° C., more preferably 85 to 105° C., and even more preferably 90 to 100° C. A lower temperature results in insufficient granulation and a smaller particle size of the obtained coagulate. As the liquid has a higher temperature, the granulation proceeds easily; however, it tends to be difficult to control.

The residence time in the second coagulation (granulation step) is preferably 0.25 to 2.0 hours, more preferably 0.5 to 1.75 hours, and even more preferably 0.75 to 1.5 hours. A shorter residence time results in insufficient granulation and a smaller particle size of the obtained coagulate. As the residence time is longer, the granulation proceeds easily; however, the obtained coagulate tends to have a poor resistance to hot-water or boiling-water whitening.

Preferably, washing and dewatering of the slurry obtained by coagulation are sufficiently performed so that the content of alkali metal and alkaline earth metal in the coagulate falls within the above-mentioned range. Water-soluble components, such as a coagulant, can be removed from the slurry by washing and dewatering the slurry. The washing and dewatering of the slurry can be performed, for example, by using a filter press, a belt press, a Guinard centrifuge, a screw decanter centrifuge, or the like. A screw decanter centrifuge is preferably used from the viewpoint of productivity and washing efficiency. The washing and dewatering of the slurry are preferably performed at least twice. As the number of times of washing and dewatering increases, the residual amount of the water-soluble components decreases. However, from the viewpoint of productivity, the number of times of washing and dewatering is preferably three times or less.

The water content of the coagulate after dewatering is preferably 5 to 50 mass %, more preferably 5 to 45 mass %, and even more preferably 5 to 40 mass %. As the coagulate has a higher water content, sufficient drying cannot be performed, which makes it difficult to obtain a coagulate with a suitable water content after drying.

The wastewater discharged during dewatering preferably has a turbidity of 1000 or less, more preferably 700 or less, and even more preferably 400 or less. A high turbidity of the wastewater indicates insufficient solid-liquid separation. This not only reduces the product yield but also causes problems, such as strainer clogging of the discharge pump, thus resulting in difficulty in performing stable operation.

The coagulate is dried so that the water content is preferably less than 0.2 mass %, and more preferably less than 0.1 mass %. As the coagulate has a higher water content, the multilayered acrylic polymer tends to undergo an ester hydrolysis reaction during melt-extrusion molding, thereby generating a carboxyl group in a molecular chain thereof.

In a preferred embodiment of the present invention, the acetone-insoluble matter of the coagulate has an acid value of 0.018 mmol/g or less, more preferably 0.015 mmol/g or less, and even more preferably 0.012 mmol/g or less. The lower limit of the acid value of the acetone-insoluble matter of the coagulate is preferably 0.001 mmol/g. As the acetone-insoluble matter of the coagulate has a lower acid value, the obtained film tends to have a higher resistance to hot-water or boiling-water whitening.

In a preferred embodiment of the present invention, the acetone-soluble matter of the coagulate has an acid value of 0.012 mmol/g or less, more preferably 0.009 mmol/g or less, and even more preferably 0.007 mmol/g or less. The acid value of the acetone-soluble matter of the coagulate preferably has a lower limit of 0.001 mmol/g. As the acetone-soluble matter has a lower acid value, the obtained film tends to have a higher resistance to hot-water or boiling-water whitening.

In a preferred embodiment of the present invention, the coagulate preferably has a glass transition temperature of 80° C. or more, more preferably 90° C. or more, and even more preferably 100° C. or more. As the coagulate has a higher glass transition temperature, the obtained film tends to have a higher resistance to hot-water or boiling-water whitening.

The coagulate of the present invention may be mixed with at least one other thermoplastic resin and extrusion-molded. Examples of such other thermoplastic resins include polycarbonate polymers, vinyl chloride polymers, vinylidene fluoride polymers, vinyl acetate polymers, maleic acid copolymers, acrylic resins, ABS resins, AES resins, AS resins, and the like. The mass ratio of such other thermoplastic resin(s) to the coagulate is preferably in the range of 0/100 to 35/65, and more preferably 0/100 to 20/80.

The coagulate of the present invention may be mixed with an acrylic resin and extrusion-molded. The mass ratio of the acrylic resin to the coagulate is preferably in the range of 0/100 to 35/65, more preferably 0/100 to 20/80. When the mass ratio is within this range, the resulting mixture has good film formability.

The acrylic resin that can be optionally used in the extrusion molding is a resin comprising a structural unit derived from methyl methacrylate, and optionally comprising a structural unit derived from an acrylic acid ester.

The amount of the structural unit derived from methyl methacrylate in the acrylic resin is preferably 85 to 100 mass %, and more preferably 92 to 100 mass %, relative to the total mass of the structural units of the acrylic resin. The amount of the structural unit derived from the acrylic acid ester of the acrylic resin is preferably 0 to 15 mass %, and more preferably 0 to 8 mass %, relative to the total mass of the structural units of the acrylic resin.

Examples of acrylic acid esters of the acrylic resin include methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate, cyclohexyl acrylate, norbornenyl acrylate, isobornyl acrylate, benzyl acrylate, phenoxyethyl acrylate, 2-hydroxyethyl acrylate, 2-ethoxyethyl acrylate, glycidyl acrylate, allyl acrylate, phenyl acrylate, and the like. Among these, alkyl acrylate having a $C_1$-$C_6$ alkyl group is preferable.

The acrylic resin used, as needed, in the extrusion molding preferably has a glass transition temperature of 95° C. or more, more preferably 100° C. or more, and even more preferably 105° C. or more. The acrylic resin preferably has a melt flow rate, at 230° C. and under a load of 3.8 kg, of 0.5 to 20 g per 10 minutes, and more preferably 0.8 to 10 g per 10 minutes.

The acrylic resin is not particularly limited in the production method thereof. For example, a known polymerization method, such as a radical polymerization method or an anion polymerization method, can be used to produce the acrylic resin. The adjustment of the acrylic resin to the above-mentioned characteristic values can be performed by adjusting the polymerization conditions; more specifically, the polymerization temperature, polymerization time, the kind and amount of chain transfer agent, the kind and amount of polymerization initiator, and the like. Such adjustment of resin characteristics by adjusting polymerization conditions is a technique well known to persons skilled in the art.

The coagulate and the acrylic polymer are preferably pelletized to facilitate their transport, storage, molding, etc. An extruder used to pelletize the multilayered acrylic polymer is preferably equipped with a bent. The bent is preferably a vacuum bent or an open bent. At least one bent is preferably disposed downstream of a resin-melting section. The pressure of the vacuum bent is preferably 30 Torr or less, more preferably 15 Torr or less, even more preferably 9 Torr or less, and most preferably 6 Torr or less. When the pressure of the vacuum bent is within the above-mentioned range, the devolatilization efficiency is excellent, and the residual moisture and monomers can be reduced.

The extruder used for pelletization is preferably a single-screw extruder. The single-screw extruder can impart a small shear energy to the multilayered acrylic polymer or the like, which can suppress thermal decomposition of the polymer. The screw configuration is preferably a full-flight screw.

The cylinder heating temperature of the extruder used for pelletization is preferably 210 to 270° C., more preferably 220 to 260° C., and even more preferably 230 to 250° C. The residence time in the extruder is preferably 7 minutes or less, more preferably 5 minutes or less, and even more preferably 3 minutes or less. A higher cylinder heating temperature or a longer residence time imparts a larger shear energy to the multilayered acrylic polymer or the like; furthermore, thermal decomposition of the polymer proceeds easily, and the obtained film tends to have a lower resistance to hot-water whitening.

The coagulate and the acrylic resin are preferably dried to reduce the water content before being subjected to extrusion molding. The water content of the multilayered acrylic polymer and the acrylic resin before being subjected to extrusion molding is preferably less than 0.2 mass %, and more preferably less than 0.1 mass %. A higher water content is likely to cause silver streak, and lower the resistance to hot-water whitening.

The coagulate and the acrylic polymer may contain, as needed, known resin additives, such as UV absorbers, anti-oxidants, light stabilizers, anti-aging agents, plasticizers, polymer processing aids, lubricants, dyes, and pigments. The total content of the resin additives is preferably 20 mass % or less per 100 mass % in total of the coagulate and the acrylic resin. For example, the resin additives may be added to the coagulate and acrylic resin molten in a film-forming machine; dry-blended with a pelletized coagulate or acrylic resin; or added to the coagulate or the acrylic resin during pelletization (a master batch method).

The coagulate and the acrylic resin preferably contain a UV absorber. Examples of UV absorbers include reactive UV absorbers, such as 2-[2-hydroxy-5-(2-methacryloyloxyethyl)phenyl]-2H-1,2,3-benzotriazole. The content of the UV absorber is preferably 0.05 to 5 parts by mass per 100 parts by mass in total of the coagulate and the acrylic resin.

When the coagulate of the present invention is used in the form of a molded article, the coagulate can be heat-melted and formed into a plate, film, or like shape by a general molding method, such as extrusion molding or injection molding.

The extruder used for film formation is preferably equipped with a bent. The bent is preferably a vacuum bent or an open bent. At least one bent is disposed downstream of a resin-melting start section. The pressure of the vacuum bent is preferably 30 Torr or less, more preferably 15 Torr or less, even more preferably 9 Torr or less, and most preferably 6 Torr or less. The extruder used for film formation is preferably a single-screw extruder, or a twin-screw extruder rotated in the same direction.

The cylinder heating temperature of the extruder used for film formation is preferably 220 to 300° C., more preferably 230 to 290° C., and even more preferably 240 to 280° C. The residence time in the extruder used for film formation is preferably 7 minutes or less, more preferably 5 minutes or less, and even more preferably 3 minutes or less. A higher cylinder heating temperature or a longer residence time imparts a larger shear energy to the multilayered acrylic polymer or the like; furthermore, thermal decomposition of the polymer proceeds easily, and the obtained film tends to have a lower resistance to hot-water whitening. Accordingly, the extrusion molding for film formation is preferably performed under a residence time in the extruder of 5 minutes or less, and at a resin temperature of 280° C. or less.

The resin film obtained from the coagulate of the present invention has an excellent impact resistance and a high resistance to stress-whitening; accordingly, whitening does not occur even when bent. The obtained resin film also has a high resistance to hot-water whitening and boiling-water whitening; accordingly, whitening does not occur even when exposed to hot water or boiling water. The resin film obtained from the coagulate of the present invention is also excellent in adhesion to other polymers; in particular, adhesion to thermoplastic polymers.

The resin film obtained from the coagulate of the present invention preferably has a thickness of 10 to 500 μm, more preferably 20 to 400 μm, and even more preferably 30 to 300 μm.

The resin film obtained from the coagulate according to a preferred embodiment of the present invention preferably has a haze ($H_0$) of 1.5% or less, more preferably 1% or less, and even more preferably 0.5% or less, when stored at ordinary temperature. The haze is measured with a test piece having an optical path length of 200 μm, in accordance with JIS K7136.

The resin film obtained from the coagulate according to a preferred embodiment of the present invention preferably has a haze variation before and after a hot-water whitening resistance test using 80° C. water ($\Delta H^{00}$) of 10% or less, more preferably 7% or less, and even more preferably of 5% or less. The resin film has a haze variation, before and after a boiling-water whitening resistance test with 100° C. water (boiling water) ($\Delta H^{100}$), of preferably 30% or less, more preferably 25% or less, and even more preferably 20% or less.

The laminate of the present invention comprises at least one layer formed of the resin film of the present invention, and at least one layer comprising at least one other thermoplastic polymer.

The at least one other thermoplastic polymer used in the laminate of the present invention is not particularly limited. Preferable examples of the at least one other thermoplastic polymer include polycarbonate polymers, vinyl chloride polymers, vinylidene fluoride polymers, vinyl acetate polymers, maleic acid copolymers, methacrylic resins, ABS resins, AES resins, and AS resins, because these polymers have excellent adhesion to the resin film of the present invention. The thermoplastic polymer molded article may be a planar molded product in the form of a film, a sheet, a plate, or the like; may be a linear molded product in the form of a pipe, a bar, or the like; or may be a molded article of various shapes, such as a lens, a prism, or a container.

The laminate of the present invention is not particularly limited in the production method thereof. The laminate of the present invention can be obtained, for example, by subjecting the above-mentioned multilayered acrylic polymer and at least one other thermoplastic polymer to co-extrusion molding; by coating extrusion molding of the multilayered acrylic resin on a molded article of at least one other thermoplastic polymer; by disposing a molded article of at least one other thermoplastic polymer in a desired mold and then melting and injecting or pouring the multilayered acrylic polymer into the mold; by placing the multilayered acrylic resin on a molded article of at least one other thermoplastic polymer and press-molding; or by thermal fusion or adhesion of the resin film of the present invention onto a molded article of at least one other thermoplastic polymer.

EXAMPLES

The present invention is described below more specifically with reference to Production Examples, Examples, and Comparative Examples. However, the present invention is not limited thereto or thereby. Hereinafter, "parts" means parts by mass.

Average Particle Size

A latex of each multilayered acrylic polymer or a slurry of each acrylic polymer coagulate before dewatering was obtained as a sample. The average particle size of each sample was determined according to a light scattering method using an LA-910 laser diffraction/scattering particle size distribution analyzer, manufactured by Horiba Ltd.

Melt Flow Rate

In accordance with ASTM-D1238, the melt flow rate (hereinafter referred to as "MFR") at 230° C. and under a load of 3.8 kg was measured.

Glass Transition Temperature

In accordance with JIS K7121, a DSC curve was measured using a differential scanning calorimeter (DSC-50, manufactured by Shimadzu Corporation) under the conditions of increasing the temperature to 250° C. once; subsequently cooling the temperature to room temperature; and then increasing the temperature from room temperature to 230° C. at a temperature-rise rate of 20° C./min. A mid-point glass transition temperature obtained from this DSC curve was defined as a glass transition temperature (hereinafter referred to as "Tg") in the present invention.

Particle Size of Coagulate

Using an LA-950V2 particle size distribution analyzer manufactured by Horiba Ltd., the median diameter of the coagulate in the granulated slurry and the proportion of particles with a particle size of 75 μm or less were determined on a volume basis.

Water Content

A sample was heated for 3 hours in a hot-air dryer set at 105° C. The weight change before and after heating was measured. The water content was calculated according to the following formula:

$$W=[(Wa-Wb)/Wa]\times 100$$

wherein W represents water content (%); Wa represents sample weight before drying (g); and Wb represents sample weight after drying (g).

Wastewater Turbidity

The turbidity of the wastewater in the first washing after centrifugation was measured by a transmitted-light turbidity method, in accordance with JIS K0101.

Bulk Density

About 5 g of a weighed coagulate powder was gently placed into a dry 10-mL measuring cylinder without consolidating the powder. The top surface of the powder layer was carefully leveled without consolidating the powder, and the loose bulk volume (V) was measured to the smallest-scale unit. The bulk density (g/cm$^3$) was calculated by m/V.

Acid Value

Two grams of a test sample was placed in 50 mL of acetone, and the resulting mixture was stirred at ordinary temperature for 24 hours. The entire volume of the obtained liquid was centrifuged at a rotation rate of 20000 rpm and a temperature of 0° C. for 180 minutes using a centrifuge (CR20GIII, manufactured by Hitachi Koki). A supernatant and a precipitate were separated. The obtained supernatant and precipitate were individually dried in vacuum at 50° C. for 8 hours to respectively obtain an acetone-soluble matter and an acetone-insoluble matter.

One gram of the acetone-soluble matter or the acetone-insoluble matter was accurately measured and dissolved in 50 mL of chloroform. After 5 minutes of nitrogen purge, several drops of bromothymol blue were added. Neutralization titration was performed using an N/100 KOH solution in ethanol.

As a control blank sample, 50 mL of chloroform subjected to nitrogen purge for 5 minutes was titrated for neutralization in the same manner as above. The acid value C (mmol/g) was calculated by the following formula.

$$C=(A-B)\times 0.01\times F$$

wherein A represents the titer amount of the test sample (mL); B represents the titer amount of the control sample (mL); and F represents the factor of the N/100 KOH solution in ethanol.

Metal Content

About 5 g of the weighed coagulate powder was decomposed by heating. The residue was measured by an ICP emission spectroscopic analyzer (model: VISTA-PRO, manufactured by Varian/SII).

Resistance to Hot-Water Whitening (80° C.)

The acrylic polymer coagulate was hot-pressed at 190° C. and at 100 kg/cm$^2$ to produce a resin film having a thickness of 200 μm. A test piece of 50 mm×50 mm was cut out of the resin film. The haze (H$_0$) was measured at room temperature in accordance with JIS K7136 using a haze meter (HM-150, manufactured by Murakami Color Research Laboratory).

Subsequently, the test piece was immersed in 80° C. water for 1 hour. The water droplets on the film surface were removed. When the film was returned to room temperature, the haze was measured.

The increment from haze at room temperature to haze after immersion in warm water ($\Delta H^{80}$) was calculated.

Resistance to Boiling-Water Whitening

A test piece of 50 mm×50 mm was cut out of the resin film used in the testing of the resistance to hot-water whitening (80° C.). The haze at room temperature (H$_0$) was measured in accordance with JIS K7136 using a haze meter (HM-150, manufactured by Murakami Color Research Laboratory).

Subsequently, the test piece was immersed in 100° C. water for 4 hours. The water droplets on the film surface were then removed, and the film was dried in a hot-air dryer set at 100° C. for 8 hours. When the temperature of the film returned to room temperature, the haze was measured.

The increment from haze at room temperature to haze after immersion in boiling water ($\Delta H^{100}$) was calculated.

In the Examples, methyl methacrylate is abbreviated as MMA, n-butyl acrylate as nBA, methyl acrylate as MA, styrene as St, allyl methacrylate as ALMA, n-octyl mercaptan (a chain transfer agent) as nOM, and sodium dodecylbenzene sulfonate as DBSS.

Production Example 1

150 parts of ion exchange water, 1.3 parts of DBSS, and 0.05 parts of sodium carbonate were placed in a reactor equipped with a stirrer, a thermometer, a nitrogen gas introducing pipe, a monomer introducing pipe, and a reflux condenser. The reactor was fully purged with nitrogen gas to make a condition with substantially no influence of oxygen. The temperature in the reactor was then set to 80° C. 0.015 parts of potassium persulfate was placed into the reactor, and stirred for 5 minutes. Subsequently, a monomer mixture of 4 parts of MMA, 4 parts of nBA, and 0.02 parts of ALMA were continuously added dropwise over a period of 20 minutes to perform an emulsion polymerization. After completion of the dropwise addition, the resulting mixture was further stirred for 30 minutes and an emulsion polymerization was performed to achieve a conversion rate of 98% or more, thus obtaining a latex containing the rigid polymer (a).

0.030 parts of potassium persulfate was added to a reactor in which the latex containing the polymer (a) had been disposed. The resulting mixture was stirred for 5 minutes. Subsequently, a monomer mixture of 4 parts of MMA, 26 parts of nBA, and 0.9 parts of ALMA was continuously added dropwise over a period of 40 minutes to perform seeded emulsion polymerization. After completion of the dropwise addition, the resulting mixture was further stirred for 30 minutes and seeded emulsion polymerization was performed to achieve a conversion rate of 98% or more, thus obtaining a latex containing the rigid polymer (a) and crosslinked rubber polymer (b).

0.055 parts of potassium persulfate was added to a reactor in which the latex containing the rigid polymer (a) and the crosslinked rubber polymer (b) had been disposed, and the resulting mixture was stirred for 5 minutes. Subsequently, a monomer mixture of 56 parts of MMA, 6 parts of nBA, and 0.2 parts of nOM was continuously added dropwise over a period of 100 minutes to perform seeded emulsion polymerization. After completion of the dropwise addition, the resulting mixture was further stirred for 60 minutes. Seeded emulsion polymerization was performed to achieve a conversion rate of 98° or more, thus obtaining a PMMA latex containing the rigid polymer (a), the crosslinked rubber polymer (b), and the rigid polymer (c) (hereinafter referred to as PMMA latex (1)). The average particle size of the PMMA latex (1) determined by a light scattering method was 0.09 μm. Table 1 shows the composition proportion of the monomer units and the average particle size of the PMMA latex (1).

TABLE 1

| | Brand name | | 1 PMMA latex 1 | 2 PMMA latex 2 | 3 PMMA latex 3 | 4 PMMA latex 4 | 5 PMMA latex 5 |
|---|---|---|---|---|---|---|---|
| Initially fed materials | Ion exchange water | Parts by mass | 150 | 150 | 150 | 150 | 150 |
| | DBSS | Parts by mass | 1.3 | 1.3 | 1.3 | 0.4 | 0.7 |
| | $Na_2CO_3$ | Parts by mass | 0.1 | 0.1 | 0.1 | 0.1 | 0.1 |
| Polymer (a) | MMA | Parts by mass | 4 | 1.3 | 2.5 | 33 | — |
| | MA | Parts by mass | 0 | 0 | 0 | 2 | — |
| | nBA | Parts by mass | 4 | 2 | 2.5 | 0 | — |
| | ALMA | Parts by mass | 0.02 | 0.03 | 0.015 | 0 | — |
| Polymer (b) | MMA | Parts by mass | 4 | 0 | 2 | 2 | — |
| | nBA | Parts by mass | 26 | 30 | 28 | 28 | — |
| | St | Parts by mass | 0 | 0 | 0 | 10 | — |
| | ALMA | Parts by mass | 0.9 | 0.6 | 0.9 | 1.0 | — |
| Polymer (c) | MMA | Parts by mass | 56 | 50 | 62 | 18 | 90 |
| | nBA | Parts by mass | 6 | 5 | 3 | 0 | 0 |
| | MA | Parts by mass | 0 | 0 | 0 | 2 | 10 |
| | nOM | Parts by mass | 0.20 | 0.15 | 0.25 | 0.04 | 0.45 |
| Average particle size | | μm | 0.09 | 0.09 | 0.09 | 0.21 | 0.10 |

In Production Examples 2 to 5, PMMA latexes (2) to (5) were obtained in the same manner as in Production Example 1, except that the amounts of starting materials and the layer compositions were changed as shown in Table 1.

Example 1

The PMMA latex (1) was coagulated under the following conditions. An aqueous solution containing 0.43 parts of magnesium sulfate and 167 parts of ion exchange water was heated to 80° C. The above latex was fed at 8.3 parts/minute for 12 minutes while stirring. After completion of the feeding, stirring was continued for 1 hour while the liquid temperature was maintained at 80° C., to thereby obtain an aggregated slurry. Further, after 267 parts of water was added to this slurry, the temperature was raised to 90° C., and heat treatment was performed for 1 hour to obtain a granulated slurry. The obtained granulated slurry was washed and dewatered at a centrifugal force of 2100 G using a screw decanter centrifuge. Subsequently, ion exchange water was added to achieve a slurry concentration of 10 mass %, and washing and dewatering were performed again using the screw decanter-type centrifugal separator. This operation was repeated 3 times in total. The obtained water-containing coagulate had a water content of 37 mass %, a median diameter of 135 μm, and contained particles having a particle size of 75 μm or less in a proportion of 22%.

The slurry was then dried in a continuous fluidized bed dryer set at 80° C. to obtain an acrylic polymer coagulate. The bulk density of the obtained coagulate was 0.42 g/cm³, and the amounts of alkali metals and alkaline earth metals in the coagulate were as shown in Table 2.

The dried acrylic polymer coagulate had a water content of 0.06 mass %, an MFR of 2.0 g/10 min, and a Tg of 90° C.; the acetone-insoluble matter of the coagulate had an acid value of 0.004 mmol/g, and the acetone-soluble matter of the coagulate had an acid value of 0.009 mmol/g.

The dried acrylic polymer coagulate was hot-pressed at 190° C. to obtain a resin film having a thickness of 200 μm. The resin film had a haze of 0.4% at room temperature, the $\Delta H^{80}$ was 3%, and the $\Delta H^{100}$ was 17°. The obtained film was found to have excellent resistance to hot-water whitening, and excellent resistance to boiling-water whitening.

Examples 2 to 9 and Comparative Examples 1 to 4

Acrylic polymer coagulates were obtained in the same manner as in Example 1, except that the type and amount of PMMA latex used, the amount of water, the type and amount of coagulant, coagulation time, temperature, and the number of times of washing and dewatering were changed as shown in Tables 2 and 3. As shown in Table 3, a coagulate of poor quality with a high wastewater turbidity of 1040 and a high resin content after dewatering of 54 mass % was obtained in Comparative Example 2. Therefore, the coagulate of Comparative Example 2 was not tested for its resin properties, metal content, or resistance to hot-water whitening.

TABLE 2

| | | | Example | | | | | | |
|---|---|---|---|---|---|---|---|---|---|
| | | | 1 | 2 | 3 | 4 | 5 | 6 | 7 |
| Production conditions | | | | | | | | | |
| Latex | PMMA latex 1 | Parts by mass | 100 | 100 | 100 | — | — | — | — |
| | PMMA latex 2 | Parts by mass | — | — | — | 100 | — | — | — |
| | PMMA latex 3 | Parts by mass | — | — | — | — | 100 | — | — |
| | PMMA latex 4 | Parts by mass | — | — | — | — | — | 70 | 70 |
| | PMMA latex 5 | Parts by mass | — | — | — | — | — | 30 | 30 |
| Aggregation step | Water | Parts by mass | 167 | 167 | 167 | 100 | 167 | 167 | 167 |
| | Magnesium sulfate | Parts by mass | 0.43 | 0.43 | 0.43 | 0.36 | — | 1.8 | 1.3 |
| | Calcium acetate | Parts by mass | — | — | — | — | 0.83 | — | — |
| | Calcium chloride | Parts by mass | — | — | — | — | — | — | — |
| | Temperature | ° C. | 80 | 75 | 75 | 78 | 80 | 83 | 80 |
| | Time | hr | 1 | 1 | 1 | 1 | 1 | 1 | 1 |

TABLE 2-continued

|  |  |  | Example | | | | | | |
|---|---|---|---|---|---|---|---|---|---|
|  |  |  | 1 | 2 | 3 | 4 | 5 | 6 | 7 |
| Granulation step | Water | Parts by mass | 267 | 267 | 200 | 330 | 150 |  | 267 |
|  | Temperature | ° C. | 90 | 93 | 90 | 90 | 88 | 95 | 95 |
|  | Time | hr | 1 | 1 | 1 | 1 | 1 | 1 | 1 |
| Washing and dewatering conditions | Number of times of washing and dewatering | Times | 3 | 3 | 3 | 3 | 2 | 2 | 3 |
| Resin physical property evaluation |  |  |  |  |  |  |  |  |  |
| Slurry evaluation | Median diameter | μm | 135 | 113 | 150 | 180 | 167 | 298 | 305 |
|  | Proportion of particles having a size of 75 μm or less | % | 22 | 29 | 18 | 14 | 15 | 3 | 4 |
|  | Water content of resin after dewatering | mass % | 37 | 43 | 47 | 41 | 35 | 30 | 30 |
|  | Turbidity of wastewater | Degree | 320 | 330 | 267 | 224 | 250 | 143 | 121 |
| Resin physical properties | Bulk density | g/cm$^3$ | 0.42 | 0.36 | 0.38 | 0.40 | 0.39 | 0.32 | 0.35 |
|  | Water content after drying | mass % | 0.06 | 0.05 | 0.07 | 0.06 | 0.06 | 0.05 | 0.05 |
|  | Acid value (insoluble matter) | mmol/g | 0.004 | 0.004 | 0.004 | 0.004 | 0.004 | 0.003 | 0.003 |
|  | Acid value (soluble matter) | mmol/g | 0.009 | 0.009 | 0.009 | 0.009 | 0.009 | 0.009 | 0.008 |
|  | MFR | g/10 min | 2 | 2 | 1.8 | 1.8 | 1.8 | 1.8 | 1.8 |
| Metal content | Na | mg/kg | 10 | 9 | 11 | 12 | 8 | 20 | 12 |
|  | K | mg/kg | 8 | 6 | 9 | 8 | 3 | 20 | 10 |
|  | Mg | mg/kg | 101 | 105 | 103 | 108 | 0 | 180 | 150 |
|  | Ca | mg/kg | 0 | 0 | 0 | 0 | 360 | 0 | 0 |
|  | Tg | ° C. | 90 | 90 | 90 | 92 | 100 | 103 | 103 |
|  | $\Sigma(N/a) \times (120 - Tg)$ |  | 81.5 | 81.1 | 84.8 | 82.5 | 98.3 | 86.4 | 65.7 |
| Resistance to hot-water whitening | Initial haze $H_0$ (before test) | % | 0.4 | 0.4 | 0.4 | 0.4 | 0.4 | 0.4 | 0.4 |
|  | ΔH (80° C. × 1 hr test) | % | 3 | 2 | 3 | 2 | 3 | 4 | 4 |
|  | ΔH (100° C. × 4 hr test) | % | 17 | 15 | 20 | 19 | 23 | 24 | 27 |

TABLE 3

|  |  |  | Example | | | Comparative Example | | | |
|---|---|---|---|---|---|---|---|---|---|
|  |  |  | 8 | 9 | 10 | 1 | 2 | 3 | 4 |
| Production conditions |  |  |  |  |  |  |  |  |  |
| Latex | PMMA latex 1 | Parts by mass | — | — | 100 | 100 | 100 | 100 | — |
|  | PMMA latex 2 | Parts by mass | — | — | — | — | — | — | — |
|  | PMMA latex 3 | Parts by mass | — | — | — | — | — | — | — |
|  | PMMA latex 4 | Parts by mass | 60 | 70 | — | — | — | — | 70 |
|  | PMMA latex 5 | Parts by mass | 40 | 30 | — | — | — | — | 30 |
| Aggregation step | Water | Parts by mass | 167 | 167 |  | 167 | 167 | 167 | 100 |
|  | Magnesium sulfate | Parts by mass | — | 1.1 |  | 0.6 | 0.5 | 0.8 | 1.9 |
|  | Calcium acetate | Parts by mass | — | — |  | — | — | — | — |
|  | Calcium chloride | Parts by mass | 1.6 | — |  | — | — | — | — |
|  | Temperature | ° C. | 85 | 83 |  | 90 | 80 | 80 | 90 |
|  | Time | Hour | 1 | 1 |  | 1 | 1 | 1 | 1 |
| Granulation step | Water | Parts by mass |  |  |  | 267 |  | 150 |  |
|  | Temperature | ° C. | 93 | 93 |  | 97 | 85 | 90 | 98 |
|  | Time | hr | 1 | 1 |  | 1 | 1 | 1 | 1 |
| Washing and dewatering conditions | Number of times of washing and dewatering | Times | 3 | 2 | 2 | 2 | 3 | 3 | 2 |

TABLE 3-continued

|  |  |  | Example | | | Comparative Example | | | |
|---|---|---|---|---|---|---|---|---|---|
|  |  |  | 8 | 9 | 10 | 1 | 2 | 3 | 4 |
| Resin physical property evaluation | | | | | | | | | |
| Slurry evaluation | Median diameter | Mm | 311 | 86 | 89 | 255 | 89 | 231 | 438 |
|  | Proportion of particles having a size of 75 μm or less | % | 2 | 38 | 38 | 6 | 55 | 8 | 1 |
|  | Water content of resin after dewatering | mass % | 32 | 40 | 20 | 32 | 54 | 28 | 27 |
|  | Turbidity of Wastewater | Degree | 90 | 387 | 392 | 165 | 1040 | 197 | 60 |
| Resin physical properties | Bulk density | g/cm³ | 0.33 | 0.41 | 0.50 | 0.36 | — | 0.4 | 0.35 |
|  | Water content after drying | mass % | 0.06 | 0.06 | 0.04 | 0.06 | — | 0.06 | 0.04 |
|  | Acid value (insoluble matter) | mmol/g | 0.004 | 0.004 | 0.004 | 0.004 | — | 0.004 | 0.004 |
|  | Acid value (soluble matter) | mmol/g | 0.008 | 0.008 | 0.009 | 0.007 | — | 0.007 | 0.006 |
|  | MFR | g/10 min | 2.3 | 2.3 | 1.8 | 1.8 | — | 2.2 | 2.1 |
| Metal content | Na | mg/kg | 23 | 20 | 16 | 12 | — | 20 | 20 |
|  | K | mg/kg | 17 | 20 | 14 | 8 | — | 15 | 20 |
|  | Mg | mg/kg | 0 | 165 | 107 | 140 | — | 122 | 240 |
|  | Ca | mg/kg | 330 | 0 | 0 | 0 | — | 0 | 0 |
|  | Tg | ° C. | 103 | 103 | 90 | 90 | — | 90 | 103 |
|  | Σ(N/a) × (120 − Tg) |  | 94.4 | 81.2 | 97.6 | 108.2 | — | 112.9 | 107.4 |
| Resistance to hot-water whitening | Initial haze H₀ (before test) | % | 0.4 | 0.4 | 0.4 | 0.4 | — | 0.4 | 0.4 |
|  | ΔH (80° C. × 1 hr test) | % | 5 | 5 | 3 | 35 | — | 28 | 32 |
|  | ΔH (10° C. × 4 hr test) | % | 28 | 23 | 14 | 70 | — | 79 | 92 |

Example 10

The latex (1) was placed in an atmosphere of −20° C. for 4 hours, and thereby frozen. The obtained frozen product was added to a threefold volume of 80° C. water containing a slight amount of a defoaming agent containing magnesium sulfate as a component, and thawed to obtain a slurry. The slurry was washed and dewatered by a centrifugal force of 2100 G using a screw decanter centrifuge. Subsequently, ion exchange water was added to achieve a slurry concentration of 10%, and washing and dewatering were performed again using a screw decanter centrifuge.

The obtained water-containing coagulate had a water content of 20% and a median diameter of 89 μm, and 38% of particles contained in the coagulate had a particle size of 75 μm or less.

The dewatered slurry was then dried with a continuous fluid-bed dryer set at 80° C. to obtain an acrylic polymer coagulate. The obtained coagulate had a bulk density of 0.50 g/cm³, and contained alkali metals and alkaline earth metals in the amounts shown in Table 2.

The dried acrylic polymer coagulate had a water content of 0.04 mass %, an MFR of 1.8 g/10 min, and a Tg of 90° C. The acetone-insoluble matter of the coagulate had an acid value of 0.004 mmol/g, and the acetone-soluble matter of the coagulate had an acid value of 0.009 mmol/g.

The dried acrylic polymer coagulate was hot-pressed at 190° C. to obtain a resin film having a thickness of 200 μm. The resin film had a haze of 0.4% at room temperature, the ΔH$^{00}$ was 3%, and the ΔF$^{100}$ was 14%.

The invention claimed is:

1. A multilayered acrylic polymer coagulate having a bulk density of 0.3 to 0.6 g/cm³ and a median diameter of 50 to 400 μm and comprising particles having a particle diameter of 75 μm or less in a proportion of 50% or less, an alkali metal, and an alkaline earth metal,
   wherein the alkali metal and the alkaline earth metal contained in the multilayered acrylic polymer coagulate are present in amounts that satisfy formula (1):

$$\Sigma(N/a) \times (120-Tg) \leq 100 \tag{1}$$

wherein
   N represents the amount of the alkali metal and the alkaline earth metal contained in the multilayered acrylic polymer coagulate (mmol/kg),
   Tg represents a glass transition temperature (° C.) of an acetone-soluble matter of the multilayered acrylic polymer coagulate determined by solubilizing the coagulate in acetone and measuring the Tg of the soluble matter, and
   a represents a valency of the alkali metal and the alkaline earth metal contained in the multilayered acrylic polymer coagulate.

2. The multilayered acrylic polymer coagulate according to claim 1, wherein the multilayered acrylic polymer coagulate is obtained by a salting-out coagulation method.

3. The multilayered acrylic polymer coagulate according to claim 1, wherein
   a multilayered acrylic polymer in the multilayered acrylic polymer coagulate consists of the acetone-soluble matter and an acetone-insoluble matter;
   the acetone-soluble matter comprises 80 to 99 mass % of a structural unit derived from methyl methacrylate and 1 to 20 mass % of a structural unit derived from alkyl acrylate having a $C_1$-$C_8$ alkyl group, and has a glass transition temperature of 80 to 100° C.; and the acetone-insoluble matter comprises 20 to 60 mass % of a structural unit derived from methyl methacrylate and 40 to 80 mass % of a structural unit derived from alkyl acrylate having a $C_1$-$C_8$ alkyl group, and has a glass transition temperature of 0° C. or less.

4. The multilayered acrylic polymer coagulate according to claim 1, wherein a multilayered acrylic polymer in the multilayered acrylic polymer coagulate consists of an acetone-soluble matter and an acetone-insoluble matter, the acetone-soluble matter comprises 80 to 99 mass % of a structural unit derived from methyl methacrylate and 1 to 20 mass % of a structural unit derived from alkyl acrylate having a $C_1$-$C_8$ alkyl group, and has a glass transition temperature of 90 to 110° C., and the acetone-insoluble matter comprises 40 to 60 mass % of a structural unit derived from methyl methacrylate, 40 to 60 mass % of a structural unit derived from alkyl acrylate having a $C_1$-$C_8$ alkyl group, and 0 to 20 mass % of a vinyl monomer copolymerizable therewith, and has a glass transition temperature of 0° C. or less.

5. A molded article, comprising the multilayered acrylic polymer coagulate of claim 1.

6. A film, comprising the multilayered acrylic polymer coagulate of claim 1.

7. A laminate comprising a layer formed of a film obtained using the multilayered acrylic polymer coagulate of claim 1, and a layer formed of a molded article comprising a thermoplastic polymer.

8. A method for producing a multilayered acrylic polymer coagulate, the method comprising:

polymerizing an acrylic monomer, at least one other monomer that is copolymerizable, a grafting agent and/or a crosslinking agent in the presence of an emulsifier to obtain a latex (I), polymerizing an acrylic monomer, at least one other monomer that is copolymerizable, and a grafting agent, optionally with a crosslinking agent, in the presence of the latex (I) to obtain a latex (II), polymerizing an acrylic monomer in the presence of the latex (II) to obtain a latex (III), aggregating the latex (I) in the presence of a coagulant to obtain a multilayered acrylic polymer aggregate, and heating the multilayered acrylic polymer aggregate to obtain a multilayered acrylic polymer coagulate, wherein the multilayered acrylic polymer coagulate has a bulk density of 0.3 to 0.6 g/cm³ and a median diameter of 50 to 400 μm and comprises particles having a particle diameter of 75 m or less in a proportion of 50% or less, alkali metal, and an alkaline earth metal, wherein the alkali metal and the alkaline earth metal contained in the multilayered acrylic polymer coagulate are present in amounts that satisfy formula (1):

$$\Sigma(N/a)\times(120-Tg)\leq 100 \tag{1}$$

wherein

N represents the amount of the alkali metal and the alkaline earth metal contained in the multilayered acrylic polymer coagulate (mmol/kg), Tg represents a glass transition temperature (° C.) of an acetone-soluble matter of the multilayered acrylic polymer coagulate determined by solubilizing the coagulate in acetone and measuring the Tg of the soluble matter; and a represents a valency of the alkali metal and the alkaline earth metal contained in the multilayered acrylic polymer coagulate.

* * * * *